(12) United States Patent
Baudu

(10) Patent No.: US 12,523,571 B2
(45) Date of Patent: Jan. 13, 2026

(54) SYSTEM FOR DETERMINING A TORQUE BETWEEN TWO ROTATING MEMBERS

(71) Applicant: NTN EUROPE, Annecy (FR)

(72) Inventor: Alexandre Baudu, Annecy (FR)

(73) Assignee: NTN Europe, Annecy (FR)

( * ) Notice: Subject to any disclaimer, the term of this patent is extended or adjusted under 35 U.S.C. 154(b) by 282 days.

(21) Appl. No.: 18/378,172

(22) Filed: Oct. 10, 2023

(65) Prior Publication Data
US 2024/0118168 A1    Apr. 11, 2024

(51) Int. Cl.
*G01M 13/021*    (2019.01)
*G01L 3/10*    (2006.01)

(52) U.S. Cl.
CPC ............. *G01M 13/021* (2013.01); *G01L 3/10* (2013.01)

(58) Field of Classification Search
CPC ........ G01M 13/021; G01L 3/10; G01L 3/109; G01L 5/221; G01L 3/02; G01L 3/101
See application file for complete search history.

(56) References Cited

U.S. PATENT DOCUMENTS

| | | | |
|---|---|---|---|
| 6,859,002 B2 * | 2/2005 | Desbiolles | G01P 3/443 318/722 |
| 7,249,527 B2 * | 7/2007 | Desbiolles | G01L 3/104 73/862.332 |
| 10,927,896 B2 * | 2/2021 | Zhong | F16C 33/585 |
| 10,942,043 B2 * | 3/2021 | Teahon | G01D 5/24433 |
| 11,794,855 B2 * | 10/2023 | Tsukamoto | B62M 6/50 |
| 2004/0061459 A1 * | 4/2004 | Desbiolles | F16C 41/007 318/400.38 |
| 2005/0103125 A1 * | 5/2005 | Desbiolles | G01L 3/104 73/862.321 |
| 2016/0056691 A1 * | 2/2016 | Hale | H02K 11/21 310/68 B |

FOREIGN PATENT DOCUMENTS

| | | |
|---|---|---|
| EP | 2602593 A1 | 6/2013 |
| EP | 2602594 A1 | 6/2013 |
| FR | 2792403 A1 | 10/2000 |
| FR | 2816051 A1 | 5/2002 |
| FR | 2821931 A1 | 9/2002 |
| FR | 2862382 A1 | 5/2005 |

* cited by examiner

*Primary Examiner* — Freddie Kirkland, III
(74) *Attorney, Agent, or Firm* — Harris Beach Murtha Cullina PLLC

(57) ABSTRACT

The invention relates to a system for determining a torque applied between two rotating members. The system includes a test body with a deformable structure arranged to transmit the torque while enabling an angular displacement according to the applied torque. The system includes two encoders each on a different rotating member and each capable of emitting a periodic signal representative of the rotational displacement of the corresponding member.

15 Claims, 4 Drawing Sheets

SYSTEM FOR DETERMINING A TORQUE BETWEEN TWO ROTATING MEMBERS

CROSS-REFERENCE TO RELATED APPLICATION

This application claims the priority of French patent application number 2210439, filed on Oct. 11, 2022, the entire contents of which are incorporated herein by reference.

TECHNICAL FIELD

The invention relates to a system for determining a torque applied between two rotating members about an axis of rotation, as well as a module for transmitting a torque between a rotating shaft and a second member which comprises such a system.

In particular, the invention applies to the determination of a torque applied between two members integrated in a transmission of a motor torque to a vehicle, for example between the electric motor or the crankset and the mechanical transmission of an electrically-assisted bicycle.

For this purpose, it is known to use a test body having an internal ring secured in rotation to means for coupling said test body to a first one amongst the members, and an external ring extending around the internal ring while having means for coupling said test body to the second one amongst the members, said rings being concentrically linked around the axis of rotation by a deformable structure which is arranged so as to transmit the torque between the members while enabling an angular displacement between said rings according to the torque applied between the members.

Such a test body may be instrumented with two encoders by equipping each of the rings with a crown carrying a respectively internal and external magnetic track which is capable of emitting a periodic signal representative of the rotational displacement of the corresponding ring. In particular, each of the tracks has a series of pairs of North and South poles to form a multipolar magnetic track outputting a pseudo-sinusoidal magnetic signal.

The determination system then comprises a torque determination device, which may in particular comprise a support carrying two respectively internal and external sensors, each comprising a pattern of sensitive elements arranged at a reading distance from the internal or external track to output a signal representative of the angular position of the corresponding encoder.

The documents FR-2 816 051, FR-2 821 931 and FR-2 862 382 describe the use of a device for comparing such signals which is capable of determining an angular offset between the rings, and therefore the applied torque inducing said angle by torsion of the deformable structure.

In known systems, the problem arises of setting the air gap, i.e. the reading distance between the tracks of the encoders and the sensors, which should be performed in an accurate, stable and equivalent manner for both sensors, so as not to distort the determination of the torque. In particular, such a setting should be able to be adjusted throughout the service life of the transmission module, in particular in case of change of the test body.

The means for setting the air gap should also have a minimum axial bulk, in particular by being contained in a casing, so as not to interfere with the outside of said casing.

SUMMARY

The invention aims to improve the prior art by providing in particular a system for determining a torque which is arranged so as to solve the aforementioned air gap setting problems.

To this end, according to a first aspect, the invention provides a system for determining a torque applied between two rotating members about an axis of rotation, said system comprising
  a test body having an internal ring secured in rotation to means for coupling said test body to a first one amongst the members, and an external ring extending around the internal ring while having means for coupling said test body to the second one amongst the members, said rings being concentrically linked around the axis by a deformable structure which is arranged to transmit the torque between the members while enabling an angular displacement between said rings according to the torque applied between said members;
  two encoders, respectively an internal one secured in rotation to the internal ring and an external one secured in rotation to the external ring, each of said encoders carrying a track capable of emitting a periodic signal representative of the rotational displacement of the corresponding ring;
  a device for determining the torque comprising a support carrying an internal sensor and an external sensor, each of the sensors comprising a pattern of sensitive elements arranged at a reading distance from the internal or external track to output a signal representative of the angular position of the corresponding encoder, said device comprising means for comparing the signals outputted by each of the sensors to determine an angular offset between the rings which depends on the applied torque;
  a casing in which the test body, the encoders and the determination device are housed, said casing having an outer wall having a cavity forming a compartment in which a subplate is fastened, said subplate being associated with the support by means of a setting screw which is arranged so that the rotation of said screw induces a translation of said support relative to the test body to enable setting of the reading distance of the tracks by the respective sensors.

According to a second aspect, the invention provides a module for transmitting a torque between a rotating shaft and a second member, said module comprising such a torque determination system, wherein the internal ring has a mating bore around the rotating shaft, said module comprising a bearing for rotatably mounting said shaft throughout an orifice of the casing.

BRIEF DESCRIPTION OF THE DRAWINGS

Other objects and advantages of the invention will appear in the following description, made with reference to the appended figures, wherein.

DETAILED DESCRIPTION

Referring to these figures, a system for determining a torque applied between two members 1, 2 rotating about an axis of rotation R, as well as a module for transmitting a torque between a rotating shaft 1a and a second member 2, 2a comprising such a system, are described hereinbelow.

In this description, the terms for positioning in space are considered with reference to the axis of rotation R. In particular, the terms "internal" and "external" relate to an arrangement respectively close to and at a distance from this axis R, and the terms "axial" and "radial" relate to an arrangement respectively along this axis R and deviating from or approaching the latter.

In particular, the system enables the determination of a torque applied between two members 1, 2 integrated in a transmission of a motor torque to a vehicle, for example at the crankset of an electrically-assisted bicycle.

Figure 1:
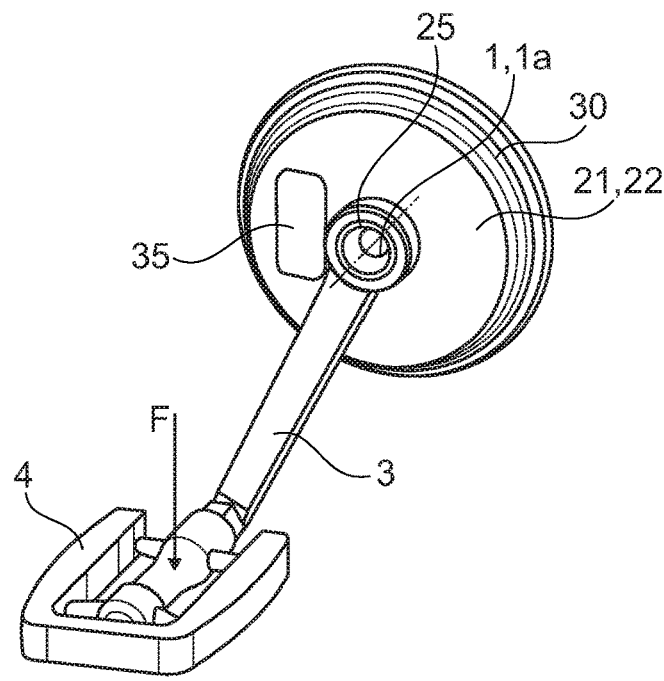
FIG. 1 is a partial perspective illustration of the crankset of an electrically-assisted bicycle equipped with a torque determination system according to the invention, FIG. 1a being an exploded perspective view of the system of FIG. 1 showing more particularly the mounting of the test body.

FIG. 1 shows a crankset of an electrically-assisted bicycle comprising a crank 3 equipped with a pedal 4, said crank being mounted on a shaft 1a driven in rotation according to the axis R to form a member 1 for applying a pedalling torque M+ according to the pedalling direction.

The system comprises a test body which allows transmitting the pedalling torque M+ to the other one amongst the members 2, which, in the figures, is shown in the form of a sleeve 2a, for example of a planetary carrier of an epicyclic gear train of a motor-driven gearbox, exerting a torque Mbv.

In this application, the pedalling effort F at the tip of the pedal 4 to be considered according to the standard EN15194:2017 is 1,500 N which, with a crank 3 length of 165 mm, generates a pedalling torque M+ in the range of 250 Nm. In particular, the torque to be transmitted by the test body is done in only one direction of rotation (that one represented by the arrow M+ in the figures), to the extent that the other direction corresponds to an idling wheel of the bicycle.

The test body has an internal ring 5 secured in rotation to means for coupling said test body to the first member 1, as well as an external ring 6 extending around the internal ring 5 while having means for coupling said test body to the second member 2.

Referring to the figures, the internal ring 5 has a bore 7 equipped with means for coupling on the shaft 1a, for example in the form of a tapping or splines.

As regards coupling to the other member 2, the figures show an internal circumferential wall of the external ring 6 which has at least one radial lobe 8 which is equipped with a means 9 for fastening said external ring on the sleeve 2a. In particular, three lobes 8 at 120° are provided, each having a fastening orifice 9, in particular by a pin or by screwing into a complementary orifice of the sleeve 2a.

The rings 5, 6 are concentrically linked around the axis R by a deformable structure which is arranged so as to transmit the torque between the members 1, 2 while enabling an angular displacement between said members according to the torque applied between said members.

In particular, the resultant torque of the pedalling torques M+ on the internal ring 5 and of the torque Mbv applied by the sleeve 2a on the external ring 6 induces a torsion between the rings 5, 6, and therefore a relative angular displacement of said rings over a torsion angle which depends on said torque.

In the shown embodiment, the deformable structure comprises a set of branches 10 angularly distributed between the rings 5, 6. In particular, the branches 10 and the rings 5, 6 are made integrally in one-piece, in particular by stamping and/or by cutting a blank made of a metallic material.

The branches 10 are inclined opposite to the direction of the rotation, which creates a lever arm which, by tensioning the branches 10, effectively reduces stresses while increasing stiffness in counterpart.

In the figures, the test body comprises three branches 10 which are separated by a sector with no branches. In particular, the sectors with no branches extend over an angle which is larger than 60°, each of the lobes 8 extending in a sector with no branches.

To facilitate coupling of the internal ring 5 to the first member 1, a nut 11 for coupling the test body with the rotating shaft 1a is affixed by being fastened in the bore 7, in particular by being fitted into said bore.

This embodiment enables a simplified manufacture of the rings 5, 6 and of the deformable structure, in particular by stamping, and separately machining the coupling nut 11 before fastening thereof. Besides the economic benefit of forming the body by stamping, the internal ring 5 may be made with a dimension that is just enough for fastening the nut 11, in order to benefit from a compact test body while maximising the length of the deformable branches 10.

In particular, the nut 11 may have a bore 11a enabling coupling of the test body on a shaft 1a of the first member 1, said bore being equipped with a tapping or with coupling splines. In the figures, the nut 11 is mounted in axial abutment on a radial shoulder 12 formed to this end on the rotating shaft 1a, and is axially immobilised between said radial shoulder and a "circlip"-type elastic washer 13 mounted in an annular groove 14 formed at the periphery on said rotating shaft.

Advantageously, the bore 7 of the internal ring 5 may have geometric means, for example splines, the external periphery of the nut 11 having complementary geometric means, for example complementary splines, to make holding of said nut in rotation in said bore reliable.

The system comprises a device for determining the angle between the rings 5, 6 which, in particular when taking account of the stiffness of the deformable structure, depends on the applied torque.

For this purpose, the system comprises two encoders, amongst which an internal encoder 15 secured in rotation to the internal ring 5 and an external encoder 16 secured in rotation to the external ring 6.

In particular, each encoder 15, 16 comprises a crown fastened respectively to a ring 5, 6 and carrying a magnetic track, respectively an internal one 15a and an external one 16a, which is capable of emitting a periodic signal representative of the rotational displacement of the corresponding ring 5, 6.

In the shown embodiment, each of the crowns is carried by an armature, respectively an internal one 15b and an external one 16b, the internal 5—respectively external 6—ring having means for fastening the internal 15b—respectively external 16b—armature thereon.

Figure 1A:
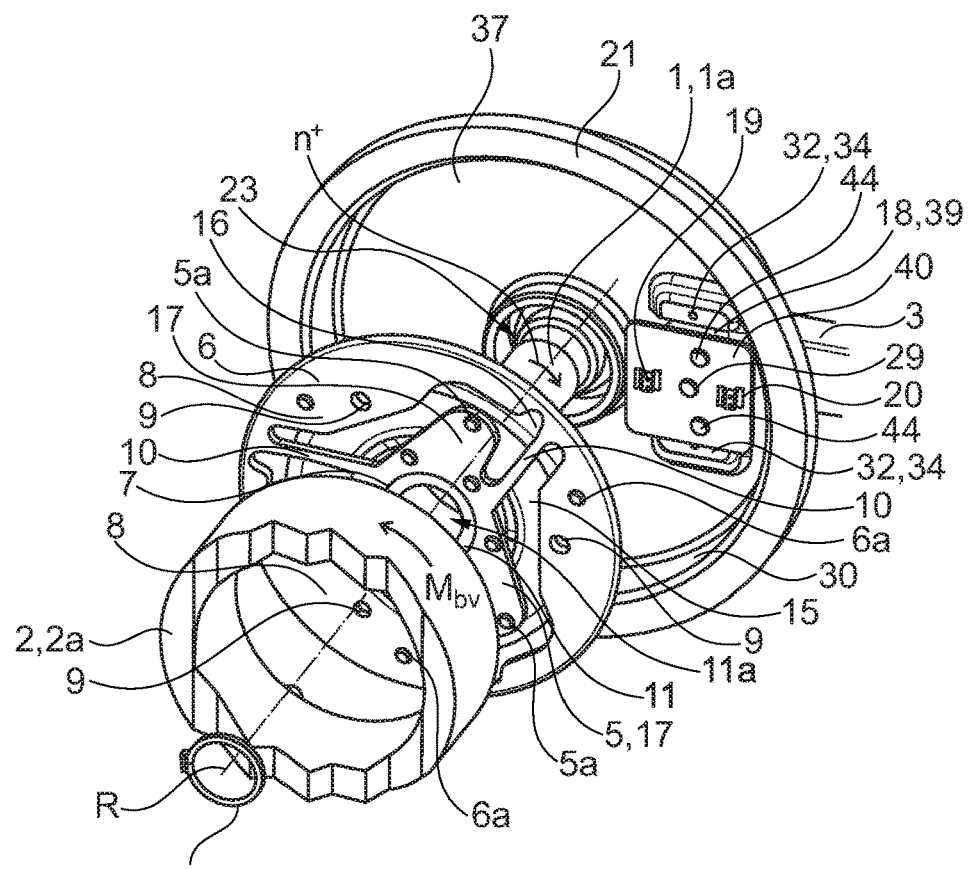

In particular, each of the rings 5, 6 has orifices 5a, 6a for fastening the armatures 15b, 16b, in particular by screwing or riveting. Referring to FIG. 1a, the internal ring 5 has an external circumferential wall provided with three radial lobes 17, each ring 5, 6 having three fastening orifices 5a, 6a arranged at 120° from each other while being formed on each of its lobes 8, 17.

According to one embodiment, a series of pairs of North and South poles is magnetised respectively over one crown of the encoders 15, 16 to form a multipolar magnetic track 15a, 16a capable of emitting a pseudo-sinusoidal shaped magnetic signal.

Each of the crowns of the encoders 15, 16 may comprise an annular matrix, for example made based on a plastic or elastomeric material, in which magnetic particles, in particular ferrite particles or rare-earth particles like NdFeB, are scattered, said particles being magnetised so as to form the magnetic tracks 15a, 16a.

The system further comprises a torque determination device which comprises:
- a support 18 carrying an internal sensor 19 and an external sensor 20, each of said sensors comprising a pattern of sensitive elements arranged at a reading distance from the internal track 15a—respectively from the external track 16a—to output a signal representative of the angular position of the corresponding encoder 15, 16;
- means for comparing the signals outputted by each of the sensors 19, 20 to determine an angular offset between the rings 5, 6 which depends on the applied torque.

Each sensor 19, 20 may comprise a pattern of at least two sensitive elements, in particular a plurality of aligned sensitive elements, as described in the documents FR-2 792 403, EP-2 602 593 and EP-2 602 594.

The sensitive elements may be based on a magneto-resistive material whose resistance varies according to the magnetic signal of the track 15a, 16a to be detected, for example of the AMR, TMR or GMR type, or of a Hall-effect probe.

According to one embodiment, the angular position may be determined incrementally by means of the signal emitted by a magnetic track 15a, 16a. In particular, the sensors 19, 20 may be arranged so as to output quadrature incremental square signals, the comparison means comprising counting means indicating the angular position of each of the encoders 15, 16 and subtraction means allowing calculating the difference between said angular positions, in particular as described in the documents FR-2 816 051, FR-2 821 931 and FR-2 862 382.

According to one embodiment, the angular position may be determined in absolute manner, i.e. with respect to a reference position, by providing for a secondary magnetic track or a specific encoding on the crown of an encoder 15, 16.

Referring to the figures, the determination system further comprises a casing 21 in which the test body, the encoders 15, 16 and the determination device are housed.

In particular, the casing 21 comprises an outer wall 22 provided with an orifice 23 throughout which the rotating shaft 1a is rotatably mounted by means of a roller bearing 24, said rotating shaft having an endpiece 25 projecting from said outer wall which is equipped with the crank 3 for applying a pedalling torque M+, which is arranged opposite said outer wall.

The outer wall 22 has a cavity 26 forming a compartment 27 in which a subplate 28 is fastened, said subplate being associated with the support 18 by means of a setting screw 29 which is arranged so that the rotation of said screw induces a translation of said support with respect to the test body, so as to enable a setting of the reading distance E of the tracks 15a, 16a by the respective sensors 19, 20.

In the figures, the outer wall 22 of the casing 21 is surrounded by a skirt 30 inside which the setting screw 29 is arranged, in particular so as to be completely contained inside said casing.

Advantageously, the entire torque determination device is contained between the outer wall 22 and the reading face of the tracks 15a and 16a. Thus, the system for setting the distance E is fitted in a height-reduced volume while ensuring that the outer wall 22 of the casing 21 remains completely clear with no protruding part (which necessarily imply that all mechanical displacements are contained within this available range) and while allowing ensuring easy sealing through an access hatch 35.

Figure 2B:
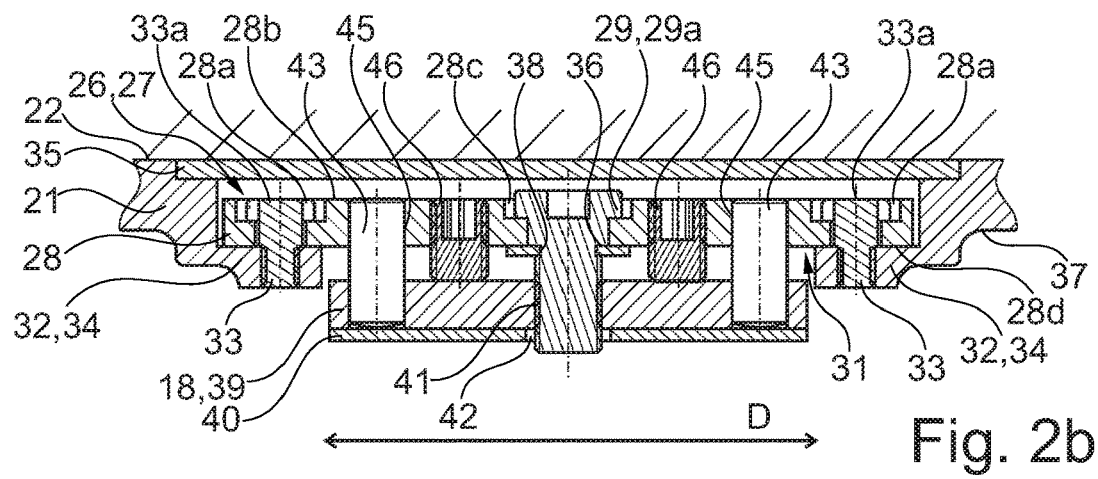

The cavity 26 has an opening 31 which opens out into the casing 21, while having two flanges 32 with which the subplate 28 is associated while covering said opening. In the shown embodiment, the opening 31 has a rectangular geometry similar to that of the subplate 28. The flanges 32 are formed over the small sides of the opening 31, said flanges opposing each other along a direction D which is perpendicular to the radial direction defining the sectional plane of FIGS. 2b, 3b and 4b.

The subplate 28 is fastened in its compartment 27 by means of two screws 33 each being associated respectively with one flange 32. To limit the axial bulk of the fastening screws 33 in the compartment 27, the subplate 28 comprises two end counterbores 28a on each of which the actuating head 33a of respectively one screw 33 is arranged set back from the upper surface 28b of said subplate.

Moreover, each flange 32 has a boss 34 formed in relief on the inner wall 37 of the casing 21, so as to form matter for making screwing of said subplate reliable while limiting the axial bulk of said screwing in the compartment 27. This arrangement also allows avoiding the screws 33 projecting inside the casing 21, and thus avoiding interference thereof with the sensors 19, 20 and/or the encoders 15, 16.

According to one embodiment, the flanges 32 and the small sides of the subplate 28 may be provided with a foolproof structure to indicate the mounting direction and position to comply with to fasten said subplate in its compartment 27.

Advantageously, the setting screw 29 has an actuating head 29a which is arranged in the compartment 27 of the cavity 26 without axially protruding beyond the outer wall 22, so as not to interfere with the crank 3 of the crankset, and thus not hinder the actuation of said crankset.

For this purpose, the subplate 28 comprises a central counterbore 28c on which the actuating head 29a is arranged set back from the upper surface 28b of said subplate. In particular, in the shown embodiment, the setting screw 29 has a larger diameter than the fastening screws 33 and is arranged so that its actuating head 29a slightly protrudes from the upper surface 28b of the subplate 28, in contrast with the heads 33a of said fastening screws, which are both arranged in the continuation of said upper surface. Thus, the setting screw 29 is easier to notice by an operator, which allows avoiding confusion between said setting screw and the fastening screws 33.

Advantageously, the cavity 26 is equipped with a closure hatch 35, in particular sealed, which is arranged in the continuation of the outer wall 22. The head 29a is arranged under the hatch 35, in particular with the setting screw 29 being arranged so that its actuating head 29a is set back with respect to the contact surface between the hatch 35 and the compartment 27, a functional clearance having to be kept between the screw 29 and the hatch 35.

Thus, the determination device, and more generally the inside of the casing 21, is protected from the outside environment when the hatch 35 is present, so as to avoid the inlet of external pollutants such as water, dust and/or mud through the cavity 26. Moreover, the absence of any axial protuberance at the hatch 35 allows avoiding interference thereof with the crank 3 of the crankset.

In particular, the determination device, like all of the inner elements of the casing 21, could constantly soak in an oil bath, the hatch 35 allowing ensuring that oil does not leak from the casing 21 which would result in a rapid degradation of the transmission mechanical system and a potential break-up of the drive elements.

The setting screw 29 is rotatably arranged throughout the subplate 28 while being immobilised in translation, and is mounted in helical connection in the support 18 so as to enable a translational displacement of said support by rotation of said setting screw.

For this purpose, the setting screw 29 is fastened to the subplate 28 by means of a metallic stop crown 36, for example of the "truarc" type, which is arranged in a groove 38 provided to this end under the actuating head 29a of said setting screw, and which axially abuts beneath the lower surface 28d of said subplate.

In particular, the stop crown 36 may be arranged so as to limit any clearance according to the axis of the screw 29 of said crown in the groove 38, for example by cambering by local deformation of said crown. Thus, the crown 36 could fill a spring function, in order to limit the axial clearances of said crown in the groove 38, and thus avoid the use of an additional spring washer.

The support 18 comprises a plate 39 on which a printed circuit board 40 is associated carrying the sensors 19, 20, the setting screw 29 being associated with said plate. The support plate 39 linked to the electronic board 40 contributes to conferring rigidity on this set. In particular, the board 40 is associated with the plate 39 by means of two fastening screws 44.

Advantageously, the set-up of the two screws 44 for fastening the board 40 on the plate 39 is provided so that the heads of said screws fall between the two encoders 15, 16, which will allow overcoming any risk of collision when setting said encoders and the sensors 19, 20 in contact during the setting operation. Furthermore, the setting screw 29 is also comprised between the two encoders 15, 16.

The setting screw 29 is mounted in a threaded hole 41 formed in the plate 39 so as to enable the translation of said plate by rotation of said setting screw, and the board 40 has an orifice 42 aligned with said threaded hole through which the end of the setting screw 29 passes.

Figure 2:
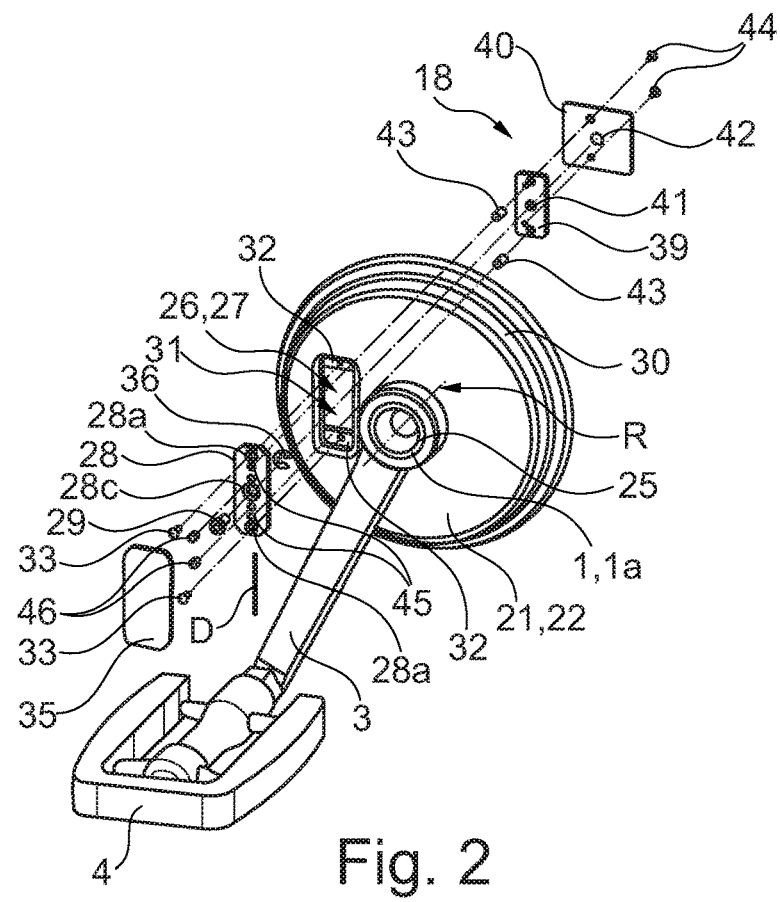
FIG. 2 is an exploded perspective view of the crankset of FIG. 1.
Figure 2A:
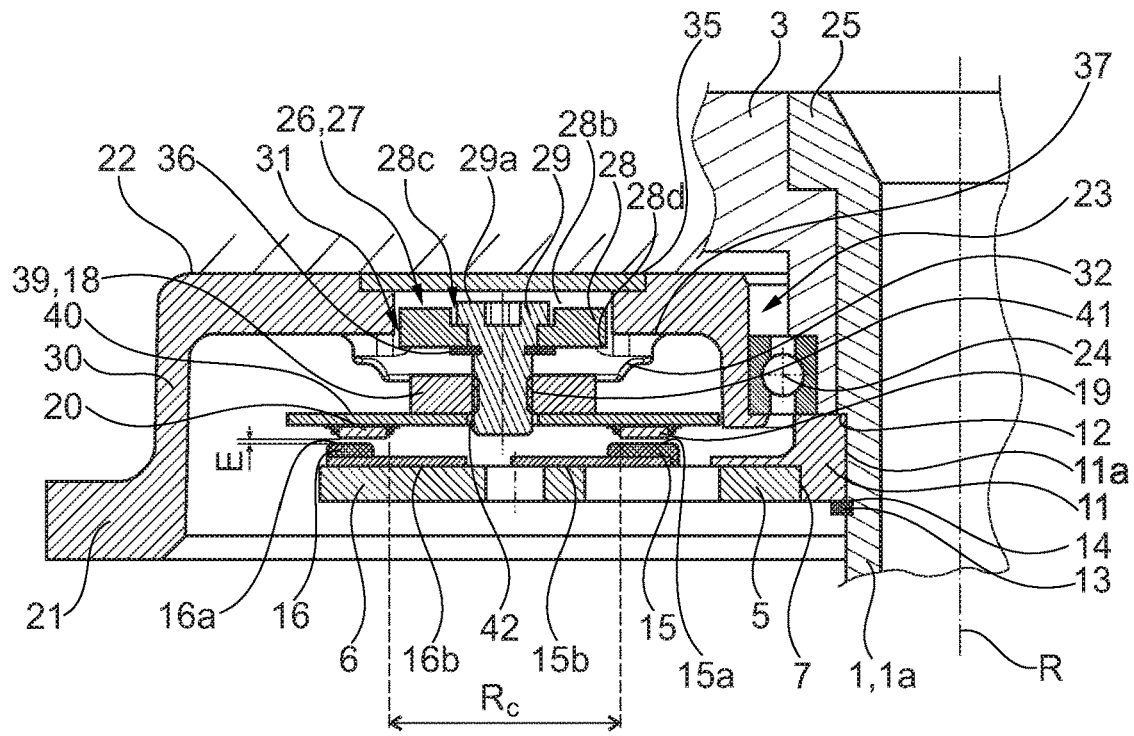
FIG. 2a being a partial cross-section of said crankset centred on the inside of the casing, FIG. 2b being a partial section, along a direction D perpendicular to a radial direction, of said determination device.
Figure 3A:
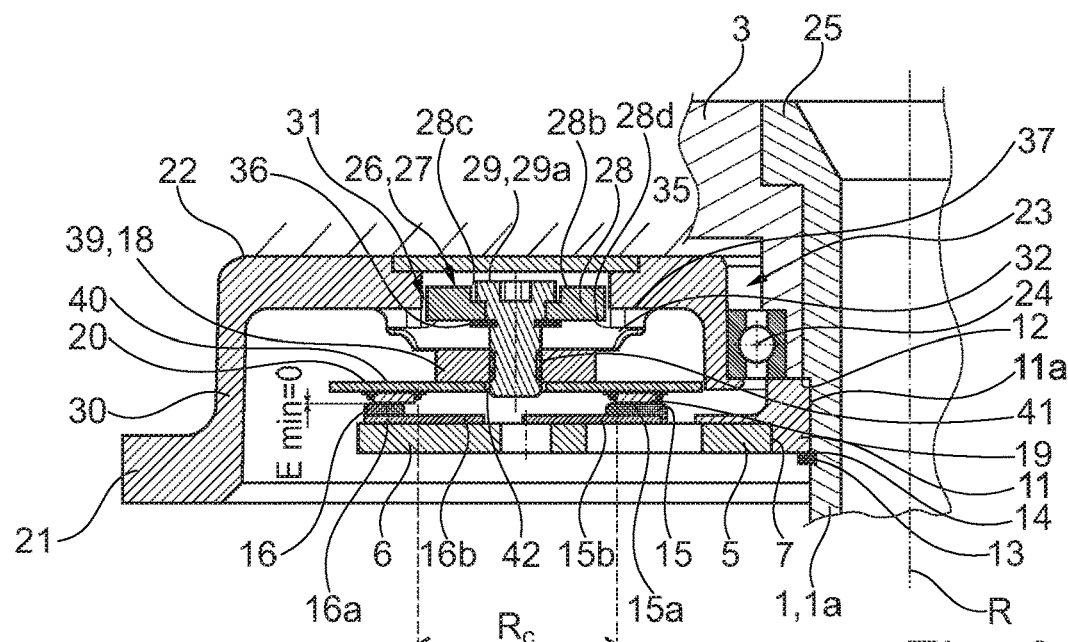
FIG. 3a, FIG. 4a, FIG. 3b, and FIG. 4b are views similar respectively to FIG. 2a and FIG. 2b, wherein the reading distance is set respectively with a minimum (FIGS. 3a, 3b) and maximum (FIG. 4a, 4b) dimension.
Figure 3B:
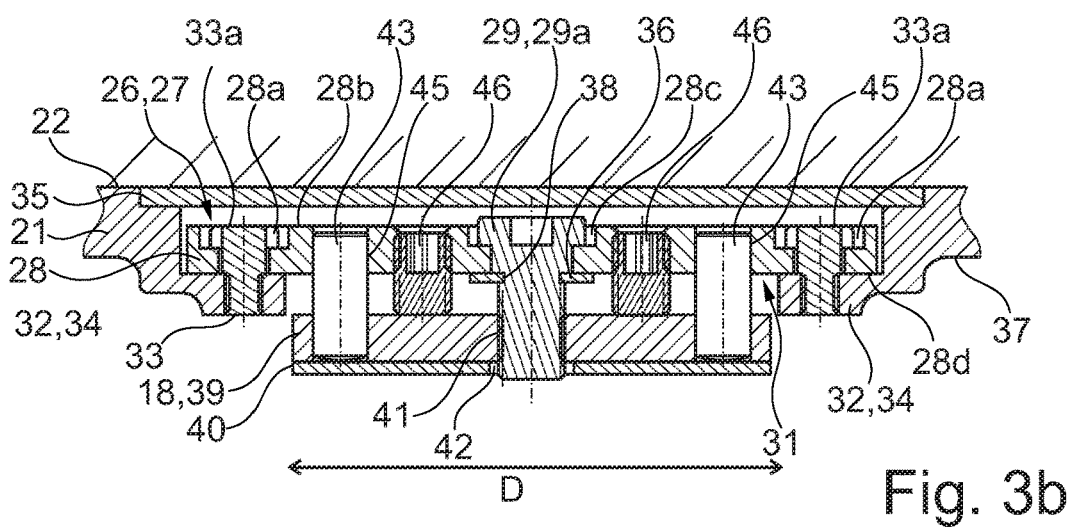
Figure 4A:
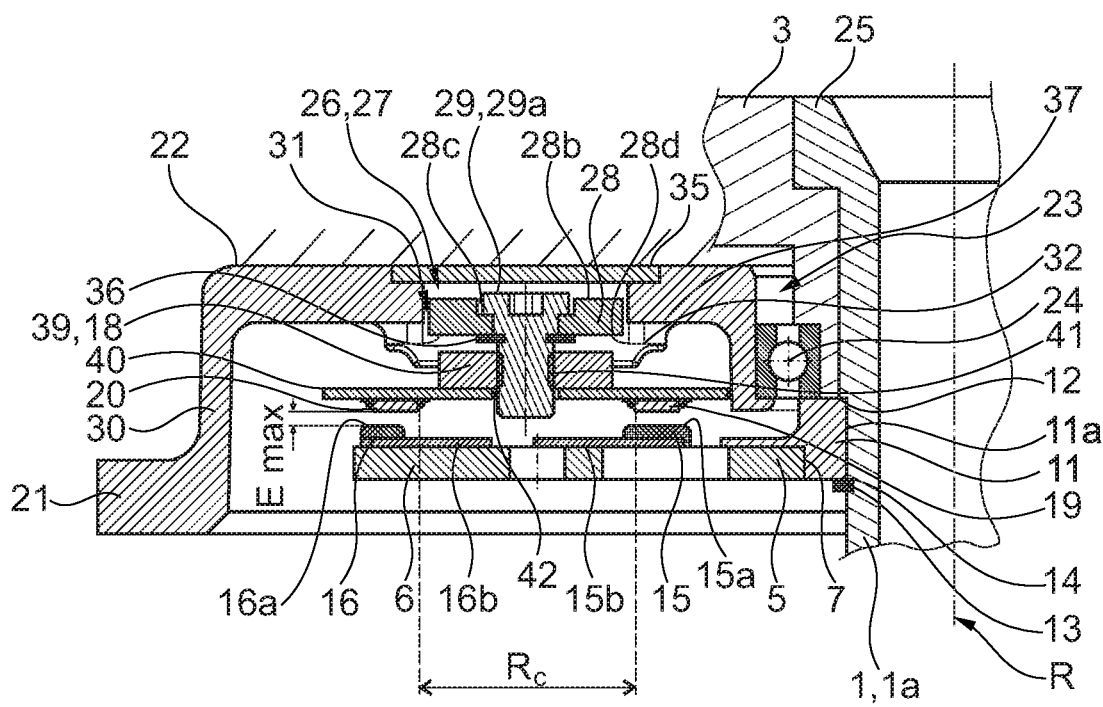
Figure 4B:
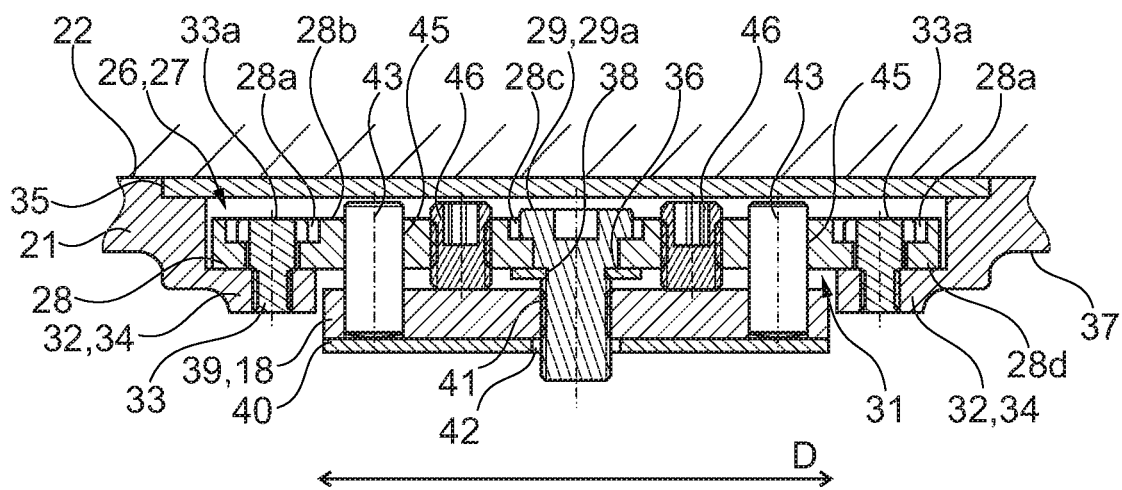

As shown in FIGS. 2a, 3a and 4a, the sensors 19, 20 are spaced apart by a radial distance $R_c$, and the setting screw 29 is associated with the support 18 at the middle of this distance $R_c$. Thus, a simultaneous setting of the reading distance E of the two sensors 19, 20 is enabled by means of the screw 29, and that being so with a good balance between said settings.

The subplate 28 is associated with the support 18 by means of at least one pin 43 which is arranged so as to immobilise the relative rotation of said support and said subplate. In the figures, the subplate 28 is associated with the support 18 by means of two pins 43 which are arranged on either side of the setting screw 29 while being aligned along the direction D described before.

Each pin 43 is fastened on one amongst the support 18 and the subplate 28, and is slidably mounted relative to the other one amongst said support and said subplate. In the shown embodiment, each pin 43 is fastened in the support 18 and is slidably mounted respectively in an orifice 45 formed in the subplate 28, so as to ensure a translational guidance between the support 18 and said subplate over a reduced dimension stroke, but enough to absorb the dimensional variations of the components of the dimensional chain which might have an impact on the reading distance E of the sensors 19, 20.

The subplate 28 further comprises at least one pressing screw 46 which is arranged so as to be bear on the support 18 when it is positioned at a desired reading distance E, in order to guarantee the immobilisation of said support, and therefore of said reading distance.

In the shown embodiment, the system comprises two pressing screws 46 arranged on either side of the setting screw 29 while being aligned along the direction D.

Advantageously, the pins 43, the pressing screws 46 and the setting screw 29 are all aligned along the direction D, and in particular perpendicularly to the reading axis of the sensors 19, 20, while being substantially evenly distributed, each of the pressing screws 46 being arranged between the setting screw 29 and a pin 43. Thus, the risks of shift of the board 40 carrying the sensors 19, 20 when setting the screw 29, as well as when immobilising the setting by tightening the pressing screws 46, are limited.

The device is arranged so as to enable a setting of the common reading distance E between the encoders 15, 16 and the sensors 19, 20 over a range of values from $E_{min}$ to $E_{max}$ ranging from 0 to 2.4 mm. In particular, to obtain the desired setting, one could, starting from the encoders 15, 16/sensors 19, 20 contact position shown in FIGS. 3a, 3b, corresponding to the minimum reading distance $E_{min}$ (zero):

unscrew the setting screw 29 by a given angle, for example by one turn, until reaching the desired distance E, then tighten the pressing screws 46 upon contact with the support plate 18, 39, in order to maintain setting of the distance E by tensioning the tapping of said setting screw in said support plate; or slightly tighten the pressing screws 46 to make them bear on the support plate 18, 39, then loosen said pressing screws by a given angle, for example by a half of a turn, to obtain a distance corresponding to the desired reading distance E, before tightening the setting screw 29 to ensure a counter-thrust for blocking said plate in position at said desired reading distance. In particular, this solution induces no clearance compensation nor any shift of the support 18.

The setting range of the common reading distance E between the encoders 15, 16 and the sensors 19, 20 should allow preserving any mechanical clearance between the different moving elements composing the torque determination device, in particular:

between the pins 43, the pressing screws 46 and the contact surface between the hatch 35 and the compartment 27, while preserving acceptable lengths for clasped guidance of the elements;

between the ring 36 and the plate 39 of the support 18;

between the inner perimeter of the opening 31 and the outer perimeter of the plate 39 of the support 18;

between the bottom of the screw 29 and the encoders 15, 16.

The invention claimed is:

1. A system for determining a torque applied between a first rotating member and a second rotating member about an axis of rotation (R), the system comprising:

a test body having an internal ring secured in rotation to a first coupler for coupling the test body to the first rotating member, and an external ring extending around the internal ring, the external right secured to a second coupling for coupling the test body to the second rotating member, the internal and external rings being concentrically linked around the axis (R) by a deformable structure which is arranged to transmit the torque between the first and second rotating members while enabling an angular displacement between the internal and external rings according to the torque applied between the first and second rotating members;

two encoders, respectively an internal encoder secured in rotation to the internal ring and an external encoder secured in rotation to the external ring, the internal encoder carrying and internal track and the external encoder each carrying an external track both the interal track and the external track being capable of emitting a periodic signal representative of the rotational displacement of the corresponding internal and external ring;

a determination device for determining the torque comprising a support carrying an internal sensor and an external sensor, the internal sensor and the external sensor each comprising a pattern of sensitive elements arranged at a reading distance (E) from the internal track or the external track to output a signal representative of the angular position of the corresponding internal and external encoder, the determination device comprising a comparator for comparing the signals outputted by the internal and external sensors to determine an angular offset between the rings which depends on the applied torque;

a casing in which the test body, the internal and external encoders and the determination device are housed, the casing having an outer wall;

the system wherein the outer wall has a cavity forming a compartment in which a subplate is fastened, the subplate being associated with the support by use of a setting screw, the rotation of the setting screw inducing a translation of the support relative to the test body to enable setting of the reading distance (E) of the internal and external tracks by the internal and external sensors.

2. The system according to claim 1, wherein the setting screw is rotatably arranged throughout the subplate while being immobilised in translation, the setting screw being mounted in helical connection in the support.

3. The system according to claim 1, wherein the cavity is equipped with a closure hatch, the hatch being arranged in the continuation of the outer wall.

4. The system according to claim 1, wherein the setting screw has an actuating head in the compartment of the cavity without protruding axially beyond the outer wall.

5. The system according to claim 1, wherein the support comprises a plate on which a printed circuit board is associated, the setting screw being associated with the plate.

6. The system according to claim 1, wherein the internal and external sensors are spaced apart by a radial distance ($R_c$), the setting screw being associated with the support in the middle of the distance ($R_c$).

7. The system according to claim 1, wherein the subplate is associated with the support by at least one pin which is arranged to immobilise the relative rotation of the support and the subplate.

8. The system according to claim 7, wherein the subplate is associated with the support by two pins which are arranged on either side of the setting screw while being aligned along a direction (D) which is perpendicular to a radial direction.

9. The system according to claim 1, wherein the subplate comprises at least one pressure screw (which is configured to bear on the support when it is positioned at a given reading distance (E).

10. The system according to claim 9, wherein two pressing screws are arranged on either side of the setting screw while being aligned along a direction (D) which is perpendicular to a radial direction.

11. The system according to claim 1, wherein the cavity has an opening having two flanges, the subplate covering the opening while being associated with the flanges.

12. The system according to claim 11, wherein each of the flanges has a boss which is formed in relief on the inner wall of the casing.

13. The system according to claim 1, wherein the deformable structure comprises a set of branches angularly distributed between the internal and external rings.

14. A module for transmitting a torque between a rotating shaft and a second member, the module comprising a torque determination system according to claim 1 wherein the internal ring has a mating bore around the rotating shaft, the module comprising a bearing for rotatably mounting the shaft throughout an orifice of the casing.

15. The module according to claim 14, wherein the shaft has an endpiece projecting from the outer wall of the casing, the endpiece being equipped with a crank for applying a torque (M+) which is arranged opposite the outer wall.

* * * * *